United States Patent [19]
Ablay

[11] Patent Number: 5,649,298
[45] Date of Patent: Jul. 15, 1997

[54] METHOD AND APPARATUS OF INTER-OPERABILITY BETWEEN CONVENTIONAL AND TRUNKED COMMUNICATIONS SYSTEM

[75] Inventor: Sewim Fewsi Ablay, Hoffman Estates, Ill.

[73] Assignee: Motorola, Inc., Schaumburg, Ill.

[21] Appl. No.: 383,540

[22] Filed: Feb. 3, 1995

Related U.S. Application Data

[63] Continuation of Ser. No. 991,908, Dec. 17, 1992, abandoned.

[51] Int. Cl.$^6$ ............................................. H04Q 7/20
[52] U.S. Cl. ............................................. 455/520
[58] Field of Search ........................ 455/33.1, 33.4, 455/34.1, 34.2, 53.1, 54.1, 54.2, 56.1, 62, 67.1, 15, 16, 17

[56] References Cited

U.S. PATENT DOCUMENTS

| | | | |
|---|---|---|---|
| 4,553,262 | 11/1985 | Coe | 455/54.2 |
| 5,054,110 | 10/1991 | Comroe et al. | 455/33.1 |
| 5,175,727 | 12/1992 | Maher et al. | 455/54.1 |
| 5,179,721 | 1/1993 | Comroe et al. | 455/34.1 |
| 5,261,117 | 11/1993 | Olson | 455/56.1 |

Primary Examiner—Reinhard J. Eisenzopf
Assistant Examiner—Thanh Le
Attorney, Agent, or Firm—Christopher P. Moreno

[57] ABSTRACT

A central networker interface is used to establish interoperability between a conventional communication system and a trunked communication system. The central networker interface provides the conventional communication system with wireline and RF connections to the trunked communication system. These connections allow each system to share information pertaining to communication units operating within their respective coverage areas.

9 Claims, 1 Drawing Sheet

5,649,298

METHOD AND APPARATUS OF INTER-OPERABILITY BETWEEN CONVENTIONAL AND TRUNKED COMMUNICATIONS SYSTEM

This is a continuation of application Ser. No. 07/991,908, filed Dec. 17, 1992 and now abandoned.

FIELD OF THE INVENTION

This invention relates generally to communication systems and, in particular, to the inter-operability of conventional and trunked communication systems.

BACKGROUND OF THE INVENTION

In general, there are three types of communication systems; conventional, trunking, and cellular. Each system comprises a plurality of communication subscriber units, either mobile or portable (hereafter referred to as mobiles), a limited number of communication resources that are transceived by a repeater, and a communication resource allocator. However, each system operates in a somewhat different mode and supports different types of communications.

Conventional systems operate by dedicating a limited number of communication resources, often referred to as frequencies, to a plurality of mobiles over a large coverage area (20 to 40 square miles is typical). Thus, a dispatcher within the conventional system may communicate, on a dedicated frequency, with one or more of the mobiles currently operating at the dedicated frequency within the conventional coverage area. Such systems are useful for local entities, such as local law enforcement, which require few frequencies and a large but limited coverage area.

Trunked systems operate by sharing a limited number of frequencies amongst a large number of mobiles over a large coverage area. By dedicating one frequency within the trunked system as a control channel, a central controller is able to dynamically allocate the remaining frequencies so that multiple intra-group or dispatcher-to-group communications may take place concurrently. Such systems are useful to entities with a large number of mobiles, such as delivery or utility services, which require a large but limited coverage area.

Cellular systems operate by sharing a limited number of frequencies amongst a large number of mobiles over many small (2 square miles is typical), overlapping coverage areas. Each small coverage area, referred to as a cell, operates in a manner similar to a trunked system; there is a control channel dynamically allocating resources so that multiple communications may occur. These cells are networked together to allow mobiles to roam from cell to cell without loss of communications. By keeping the coverage area of each cell small, frequencies used within one cell may be reused in another cell which does not have an overlapping coverage area. Such systems are used in mobile car telephone systems, where efficient processing of one-to-one calls is required.

In general, each type of system described above is considered a stand-alone system. That is, they are not designed to communicate with one another. Their use of different frequencies and channel access protocols are examples of this incompatibility. However, as the communication business grows, many system users have changed from locally based users to more regional or nationally based users.

As result, once stand-alone systems are required to be linked together to support customer needs. This linking can be within similar systems, such as multiple conventional systems (See Maher et. al., U.S. Pat. No. 5,175,727. It is also possible to interconnect dissimilar systems, such as cellular and trunking systems (See Comroe U.S. Pat. Nos. 5,218,716; 5,313,654; 5,179,721; and 5,239,674. However, conventional systems, due to the dedicated nature of their communication resources, do not interface well with the shared communication resources of either a cellular or trunked system.

It is known for some communication units to operate within either type of system by changing their operating frequencies and channel access protocols. For instance, it is possible for a mobile based within a conventional system to operate within a trunked system. However, this ability does not allow another mobile or dispatcher within the conventional system to communicate with a mobile that has roamed into a trunked system. Therefore a need exists for a method which allows conventional systems to communicate with their associated mobiles that have roamed into, and are currently operating within, a trunked system.

DESCRIPTION OF A PREFERRED EMBODIMENT

Figure 1:
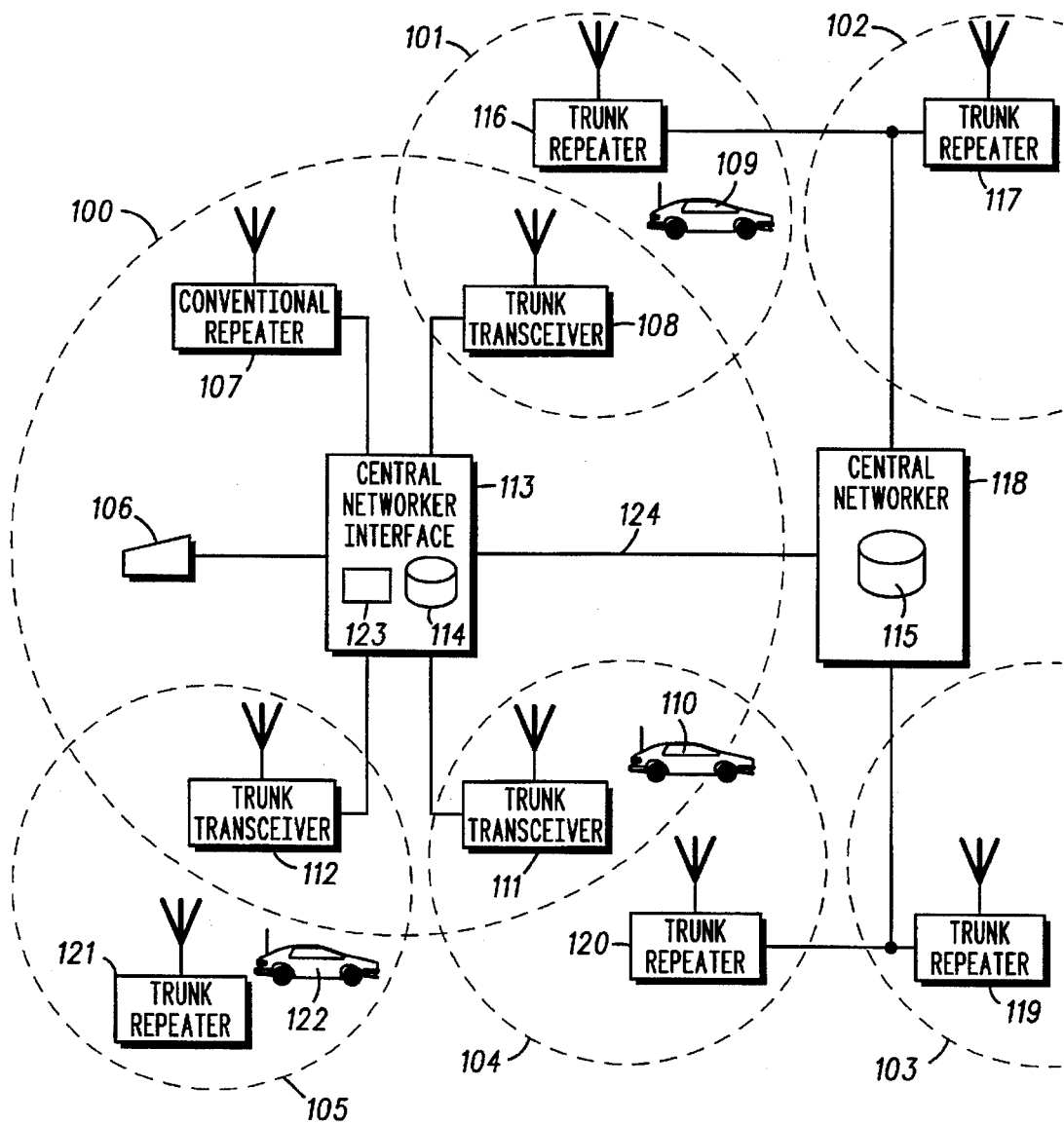
FIG. 1 illustrates a method for linking a conventional system to multiple trunked systems in accordance with the present invention.

FIG. 1 illustrates a wide area communication network comprised of a conventional coverage area 100, trunked coverage areas 101, 102, 103, 104, and 105, a dispatcher station 106, a conventional repeater 107, fixed trunked transceivers 108, 111, and 112, mobiles 109, 110, and 122, a central networker interface 113, data bases 114 and 115, trunked repeaters 116, 117, 119, 120, and 121, a central networker 118, a computing device containing dispatch application software (hereafter referred to as the computer) 123, and a communication path 124. The conventional coverage area 100 and trunked coverage areas 101, 104, and 105 may comprise coverage areas that substantially overlap. In the event that no common overlap area exists, the central networker interface 113, in conjunction with the computer 123 can appropriately determine how to route messages to a roaming mobile based upon vehicle location subsystems such as LORAN-C or GPS.

The dispatcher station 106 may comprise a dispatch terminal used to communicate with mobiles operating within the conventional coverage area 100. The functionality of the dispatcher station 106 includes at least the human or a man-machine interface to a dispatch user, as well as means for controlling access to the conventional repeater 107 or trunked transceiver 108, 111, or 112. Alternatively, for minimizing external interfaces and cost, the dispatch station 106 may be physically implemented to consolidate the functionality of the dispatch station 106 and central networker interface 113, for example, as would be embodied in a commonly available personal desktop computer. The messaging services available to a dispatch user include, but are not limited to: Individual or Group Dispatch Calls, Telephone Interconnect or Data Messaging.

The mobile radios 109 and 110 may comprise in-car radios, based within the conventional coverage area 100, capable of operation within a conventional or trunked communication system and interfacing to data messaging souces such as keypad/display terminals or vehicle location subsystems such as LORAN-C or GPS. The data bases 114 and 115 comprise memory devices such as RAM, ROM, EEPROM, or any other digital storage device.

The wide area communication network is established via the central networker 118 and its connections to the trunked repeaters 116, 117, 119, and 120. Such a network is capable of region-wide or even nation-wide coverage areas. Methods of maintaining communications with mobiles that roam between trunked coverage areas within this network are known, as is the operation of the central networker 118 or zone controller. See Comroe et. al., U.S. Pat. No. 4,833,701 which is incorporated herein as technical reference.

The conventional communication system is established with the dispatcher station 106, the conventional repeater 107, and mobiles 109, 110, and 122. The present invention requires the communication path 124, preferably a wireline path such as a land-based telephone connection, between the central networker interface 113 and the central networker 118. This link allows the data base 115, comprised of information pertaining to the conventional system and trunked systems, to be built within the central networker 118. The information contained in the data base 115 reflects the conventional system's I.D. and capabilities, the I.D.'s of mobiles within that conventional system as well as information pertaining to the trunked network. For example, the I.D. information associated with mobile 109 could be stored within the site data base 115 as "FCC-ID, Frequency-Band, Channel, Unit-ID=KBS359, 800_MHz, 808.125, Unit_7" indicating that its home system is the conventional system identified with callsign KBS359, operating on the 800 MHz channel having fixed-end transmit frequency of 808.125 MHz. Thus, when mobile 109, which is based within the conventional system, roams into the trunked coverage area 101, it switches to a trunked mode of operation, allowing the central networker 118 to recognize its conventional I.D., via the trunked repeater 116, and assign it a temporary trunked I.D. for this particular trunked coverage area. The data base 115 is updated to reflect the current site location, temporary I.D. of the mobile 109, and correspondence to the mobile's conventional identity. Also, this information is sent to and stored by the data base 114. The computer 123 utilizes this information to determine the location of the mobile 109. For example, if the dispatcher station 106 needs to send a message to the mobile 109, the computer 123 can access the data base 114 and determine via a known routing algorithm if the mobile 109 is currently operating at a location within the conventional system, the non-networked trunked system associated with the trunked coverage area 105, or the wide area communication network. If the mobile 109 is currently operating at a location within the conventional system, the central networker interface 113 will utilize a communication resource within the conventional system. If, however, the mobile 109 is currently operating at a location within the wide area communication network, the central networker interface 113 will access the wide area network either through the wireline link, and hence the central networker 118, or through an RF (radio frequency) communication resource, after having determined that the wide area communication network and RF communication resource are available and both support communication messaging of the type desired by the dispatcher. In the event that the mobile 109 is currently operating within one of the coverage areas of a non-networked system, the computer 123 may utilize prior location subsystem information received from the mobile 109 as part of a message routing algorithm.

Trunked transceivers 108 and 111 allow the present invention to provide the conventional system RF access to the wide area communication network for either local dispatcher to mobile communications, e.g. trunked transceiver 108 to trunked repeater 116 to mobile 109, or remotely for the case in which the mobile is within coverage areas 102 or 103. In the context of the present invention, a trunked transceiver is a radio capable of trunked mode access signalling, as well as voice and data message transmission and reception. By placing at least one such transceiver within an adjacent trunked coverage area, the dispatcher station 106, in conjunction with the central networker interface 113, can choose to communicate with a mobile currently operating within the wide area communication network via the central networker 118 or via a trunked transceiver. It is possible for the central networker interface 113 to default to one method, but utilize the other if conditions so dictate. For example, if the central networker interface 113 defaults to the central networker 118 for communication with the wide area communication network but finds that the link is non-operational or that the central networker 118 is currently too busy to respond to its requests, it could use the trunked transceivers 108 or 111 to establish communications.

It is understood that the present invention is also capable of communicating with non-networked trunked systems. The trunked repeater 121 establishes a local trunked system that is not connected via the central networker 118 to the aforementioned wide area trunked network. In this case, communications between the conventional system and the non-networked trunked system are performed via the trunked transceiver 112. The central networker interface 113 would have prior knowledge that communications to mobiles within regions such as the trunked coverage area 105 could only be be made via the trunked transceiver 112.

Various system configurations could also require the central networker interface 113 to make priority decisions regarding access to its associated trunked transceivers. For example, if the dispatch station 106 and the mobile 110 (operating in trunked mode) attempt to communicate with the mobile 122 simultaneously, the central networker interface 113 may choose to give the dispatch station 106 access priority to the trunked transceiver 112. Also, attempts by the dispatch station 106 and the mobile 110 (operating in conventional mode) to communicate with the mobile 109 simultaneously could cause the central networker interface 113 to give the dispatch station 106 access priority to the trunked transceiver 108. In any operational configuration, it is understood that communications by the central networker interface 113 with any of its associated trunked transceivers (networked or non-networked) will appear the same. That is, the central networker interface need only determine which trunked transceiver to utilize; the interface will be the same in each case.

The present invention allows a conventional system to communicate with its associated mobiles that have roamed out of the conventional coverage area and are currently operational within a trunked coverage area. The present invention establishes connections to networked and non-networked trunking systems via a central networker interface. Using wireline connections and trunking transceivers, the central networker interface allows a conventional system to share information with various trunking systems, thereby expanding the conventional system's effective coverage area.

I claim:

1. In a wide area communication network that comprises a plurality of trunking sites operably coupled together via a central networker, a method for connecting a conventional communication system to the wide area communication network, the method comprises the steps of:

a) providing a communication link between the conventional communication system and the central networker;

b) generating, within the central networker, a database for storage of location information pertaining to communication units associated with the conventional communication system, wherein the communication units communicate with the conventional communication system when operating within a conventional coverage area of the conventional communication system and communicate with the wide area communication network when operating within a trunked coverage area of the wide area communication network; and c) entering, within the central networker, the location information into the database.

2. The method of claim 1, wherein step (c) further comprises storing location information of the communication units in the database, wherein the location information indicates that a particular communication unit is located within a one of the plurality of trunking sites and the conventional communication system.

3. The method of claim 2 further comprising the steps of:

d) transferring, via the communication link, the location information from the database to a central networker interface within the conventional communication system; and e) utilizing, by the central networker interface, the location information of the particular communication unit to transmit communications to the particular communication unit via a one of a communication resource and the central networker, wherein the communication resource is within the conventional communication system.

4. The method of claim 1 further comprising the steps of:

d) providing a fixed trunking transceiver that wirelessly couples the conventional communication system with at least one adjacent trunking site within the wide area communication network; and e) selecting, by a central networker interface forming a part of the conventional communication system, a one of the fixed trunking transceiver and the central networker to communicate to a communication unit within the at least one adjacent trunking site based on a predetermined condition.

5. The method of claim 4 further comprises determining the predetermined condition based on whether the trunking transceiver or the central networker is presently supporting a greater amount of communications.

6. In a wide area communication network that comprises a plurality of trunking sites operably coupled together via a central networker, wherein coverage area of a conventional communication system resides at least partially within the wide area network, wherein the conventional communication system includes a plurality of communication units, a dispatcher station, and a limited number of repeaters that transceive information between the communication units and the dispatcher station, wherein the plurality of communication units communicate with the conventional communication system when operating within a conventional coverage area of the conventional communication system and communicate with the wide area communication network when operating within a trunked coverage area of the wide area communication network, the conventional communication system is improved to comprise:

a central networker interface module, operably coupled to the dispatcher station and the central networker such that the conventional communication system is operably coupled to the wide area communication network via the central networker, wherein the central networker includes a database for storage of location information pertaining to the plurality of communication units.

7. The improved conventional communication system of claim 6 further comprising a fixed trunking transceiver that is operably coupled to the central networker interface module and at least one adjacent trunking site such that the conventional communication system is operably coupled to the wide area communication system network via the central networker and the trunking transceiver.

8. The improved conventional communication system of claim 7 further comprising means, forming a part of the central networker interface module, for selecting a one of the trunking transceiver and the central networker to communicate to a communication unit within the at least one adjacent trunking site based on a predetermined condition.

9. The improved conventional communication system of claim 7, wherein the location information indicates that a particular communication unit is located within a one of the plurality of trunking sites and the conventional communication system.

* * * * *